United States Patent [19]

Sankaran et al.

[11] Patent Number: 5,794,246

[45] Date of Patent: Aug. 11, 1998

[54] METHOD FOR INCREMENTAL AGGREGATION OF DYNAMICALLY INCREASING DATABASE DATA SETS

[75] Inventors: Mohan Sankaran, Hayward; Sankaran Suresh, Sunnyvale; Mon Wong, San Jose; Diaz Nesamoney, San Francisco, all of Calif.

[73] Assignee: Informatica Corporation, Menlo Park, Calif.

[21] Appl. No.: 846,934

[22] Filed: Apr. 30, 1997

[51] Int. Cl.$^6$ ................................................ G06F 15/00
[52] U.S. Cl. ........................... 707/101; 707/3; 707/4; 707/7
[58] Field of Search ................................. 707/3, 4, 7, 101

[56] References Cited

U.S. PATENT DOCUMENTS

| | | | |
|---|---|---|---|
| 5,455,945 | 10/1995 | Vanderdrift | 707/2 |
| 5,511,190 | 4/1996 | Sharma et al. | 707/1 |
| 5,519,859 | 5/1996 | Grace | 707/3 |
| 5,537,589 | 7/1996 | Dalal | 707/101 |
| 5,675,785 | 10/1997 | Hall et al. | 707/102 |
| 5,713,020 | 1/1998 | Reiter et al. | 707/4 |

*Primary Examiner*—Thomas G. Black
*Assistant Examiner*—Jean R. Homere
*Attorney, Agent, or Firm*—Wagner, Murabito & Hao

[57] ABSTRACT

A method of performing incremental aggregation of dynamically increasing database data sets. An embodiment of the present invention operates within a data mart or data warehouse to aggregate data stored within an operational database corresponding to newly received data to provide current information. Initially, a computer server creates an intermediate file which is initialized by the server with an aggregate data set. The aggregate data set consists of data values and count values that each correspond to specific group identifiers. The computer determines if any group identifiers within a new set of inputs data are identical to any group identifiers stored within the intermediate file. If an inputted group identifier matches a stored group identifier, the inputted data value is aggregated with the stored data value and the count value corresponding to the specific stored group identifier is incremented by one. If an inputted group identifier does not match any of the stored group identifiers, the inputted group identifier and corresponding data value are stored within the intermediate file and a count value of one is appended to that specific group identifier. Once all the group identifiers within the new set of input data have been determined, the computer stores all the changes that were made to the intermediate file into the aggregate data set.

16 Claims, 4 Drawing Sheets

METHOD FOR INCREMENTAL AGGREGATION OF DYNAMICALLY INCREASING DATABASE DATA SETS

FIELD OF THE INVENTION

The present invention relates to database systems. More specifically, the present invention pertains to a method for incremental aggregation of a dynamically increasing computer database data set.

BACKGROUND OF THE INVENTION

Computers are used to perform a wide variety of applications in such diverse fields as finance and commercial transactions, manufacturing, healthcare, telecommunications, etc. Most of these applications typically involve inputting data, processing the data according to a computer program, and then storing the results in a database. As computers became more powerful, faster, and versatile, the amount of data that can be processed correspondingly increased. In order to keep up with advances in computer technology, it became imperative that databases be designed for peak operational efficiency. Consequently, operational databases were constructed, categorized, and formatted in a manner conducive for maximum throughput, access time, and storage capacity.

Unfortunately, the raw data found in these operational databases often exist as rows and columns of numbers and code which, when viewed by a human, appears bewildering and incomprehensible. Furthermore, the scope and vastness of the raw data stored in modern databases is overwhelming to a casual human observer. Hence, applications were developed in an effort to help interpret, analyze, and compile the data so that it may be readily and easily understood by a human. This is accomplished by sifting, sorting, and summarizing the raw data before it is presented for display. Thereby, individuals can now interpret the data and make key decisions based thereon.

Extracting raw data from one or more operational databases and transforming it into useful information is the function of data "warehouses" and data "marts." In data warehouses and data marts, the data is structured to satisfy decision support roles rather than operational needs. Before the data is loaded into the data warehouse or data mart, the corresponding source data from an operational database is filtered to remove extraneous and erroneous records; cryptic and conflicting codes are resolved; raw data is translated into something more meaningful; and summary data that is useful for decision support, trend analysis or other end-user needs is pre-calculated. In the end, the data warehouse is comprised of an analytical database containing extremely large amounts of data useful for decision support. A data mart is similar to a data warehouse, except that it contains a subset of corporate data for a single aspect of business, such as finance, sales, inventory, or human resources. With data warehouses and data marts, useful information is retained at the disposal of the decision makers.

An example of the type of company that would use data warehousing is a hotel chain having thousands of hotels located worldwide which all keep track of the details of each customer's visit. By warehousing this data, top executives of the hotel chain can access this stored data from the data warehouse, which can be use to make key decisions on how to better serve their customers throughout the world.

One problem associated with both data warehouses and data marts involves aggregating the extremely large amounts of data stored within operational databases with the frequent input of extremely large amounts of data. By aggregating the data stored within the data warehouse or data mart with newly inputted data, the raw data is translated into the most current meaningful information that can be relied upon by decision makers. It is important for decision makers to have the most up to date and current information so that key decisions are based on information that is the most representative of their business at the time of the decision. The problem with aggregating the data stored within the data mart or data warehouse with the newly inputted data is that it takes a very long time to perform. The reason for the long aggregation processing time is that all the pertinent data stored within the data mart or data warehouse is reaggregated along with the newly inputted data. The problem of long aggregation processing time becomes compounded as very large amounts of data are frequently received for input into the data mart or data warehouse. For instance, if a data warehouse contains terabytes of stored data and one million records of data are received for input every week, the central computers accessing the data warehouse are overwhelmed trying to perform the reaggregations of the stored complete data set each time new data is received for input.

Therefore, it would be advantageous to provide a method for the central computers that access data warehouses, data marts, and databases to be able to easily aggregate sets of data stored within them with large amounts of frequently inputted data. The present invention provides this advantage.

SUMMARY OF THE INVENTION

The present invention is a method of performing incremental aggregation of dynamically increasing database data sets. An embodiment of the present invention operates within a data mart or data warehouse to aggregate data stored within an operational database corresponding to newly received or inputted data to provide the most current up-to-date information. Initially, a computer server creates an intermediate file which is initialized with an aggregate data set. The aggregate data set consists of data values and count values that each correspond to specific group identifiers. Once the aggregate data set is stored within the intermediate file of the data mart or data warehouse, the present invention is ready to receive a new set of input data, consisting of data values that each correspond to specific group identifiers. Thereupon, the computer determines if any of the group identifiers located within the new set of inputs are identical to any of the group identifiers stored within the intermediate file. If an inputted group identifier matches a stored group identifier, the inputted data value corresponding to the inputted group identifier, is aggregated with the stored data value corresponding to the stored group identifier. The count value corresponding to the stored group identifier is incremented by the value of one. If an inputted group identifier does not match any of the group identifiers stored within the intermediate file, the inputted group identifier and corresponding inputted data value are stored within the intermediate file and a count value of one is appended to the that specific group identifier. Once all the group identifiers within the new set of input data have been determined, the computer to stores all the changes that were made to the intermediate file into the aggregate data set. By storing only the changes that occurred to the intermediate file, the aggregate data set is updated with the most current information without having to update the entire aggregate data set.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method for incremental aggregation of dynamically increasing database data sets are described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
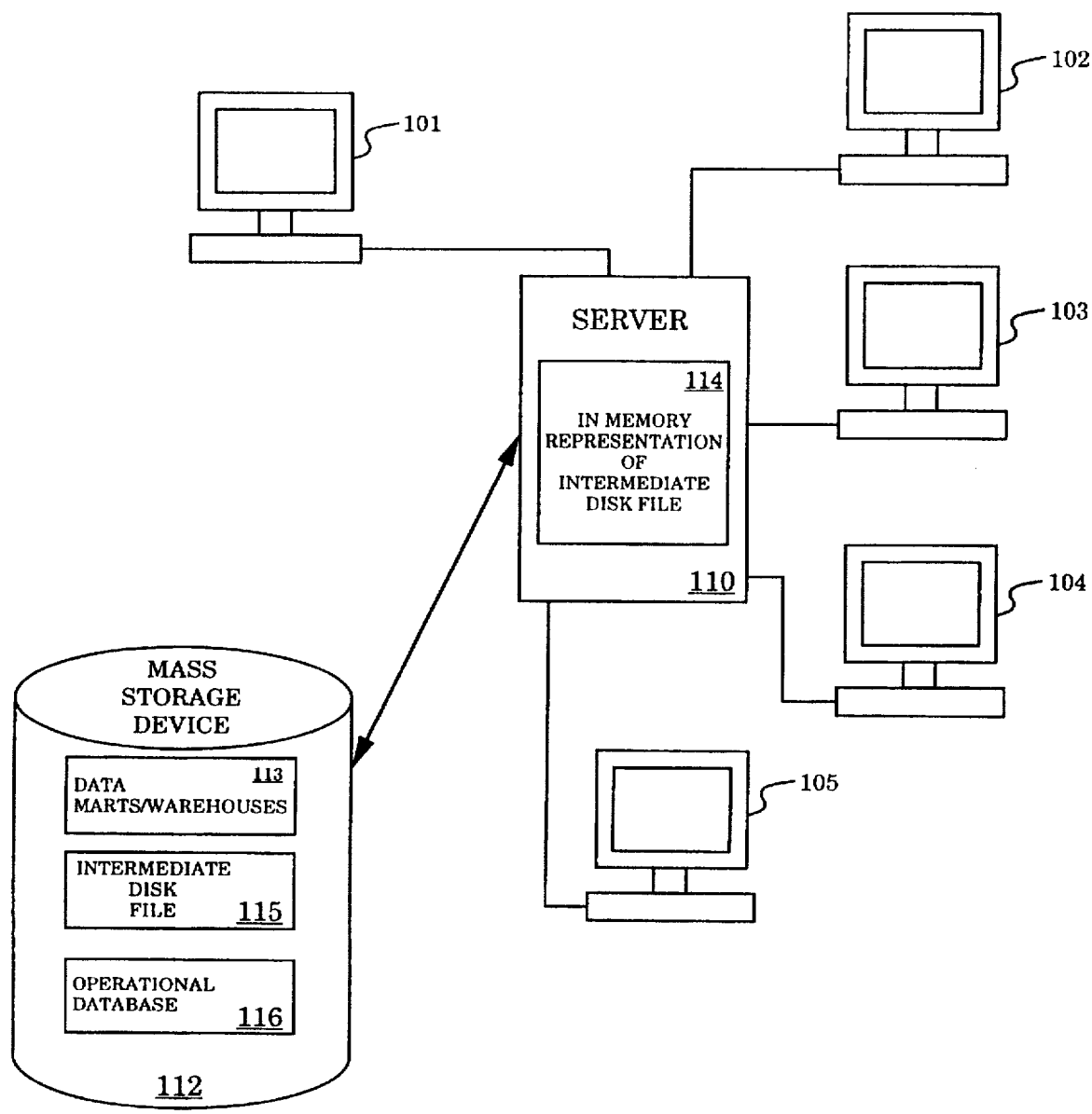
FIG. 1 illustrates a computer system database that the present invention resides within to perform its operations of incremental aggregation on dynamically increasing database data sets.

FIG. 1 illustrates a computer system database that the present invention resides within to perform its aggregate operations of inputted data into the database system. This database system is made up of dedicated computer terminals 101–105 (e.g., personal computers, laptop computers, workstations, terminals, etc.) which are used to access the information accessible to server 110 (e.g., Unix or NT server computer). Each computer terminals 101–105 has its own physical memory system (e.g., hard drive, random access memory, read only memory, etc.) for storing and manipulating data. Server 110 is connected to mass storage device 112 which allows computer terminals 101–105 to access extremely large amounts of data located within mass storage device 112. Server 110 also has its own physical memory system which is accessible by computer terminals 101–105. Within the memory system of server 110 is located an in memory representation of the intermediate disk file 114, which is used during the aggregation operations of the present invention within server 110 for display on computer terminals 101–105. Located within mass storage device 112 is operational database 116, which stores the raw data for a data mart or data warehouse. Data marts/warehouses 113, located within mass storage device 112, translates the raw data stored within operational database 116 into information that is more meaningful for decision support. Either intermediate disk file 115, located within mass storage memory device 112, or the in memory representation intermediate disk file 114 can be used by the present invention to perform its aggregation operations. Server 110 and mass storage device 112 are representative of a data warehouse, data mart, or any large database. It is important to point out that data marts/warehouses 113, intermediate disk file 115, and operational database 116 could each reside within a separate mass storage device and each mass storage device could be connected to a separate server.

Figure 2:
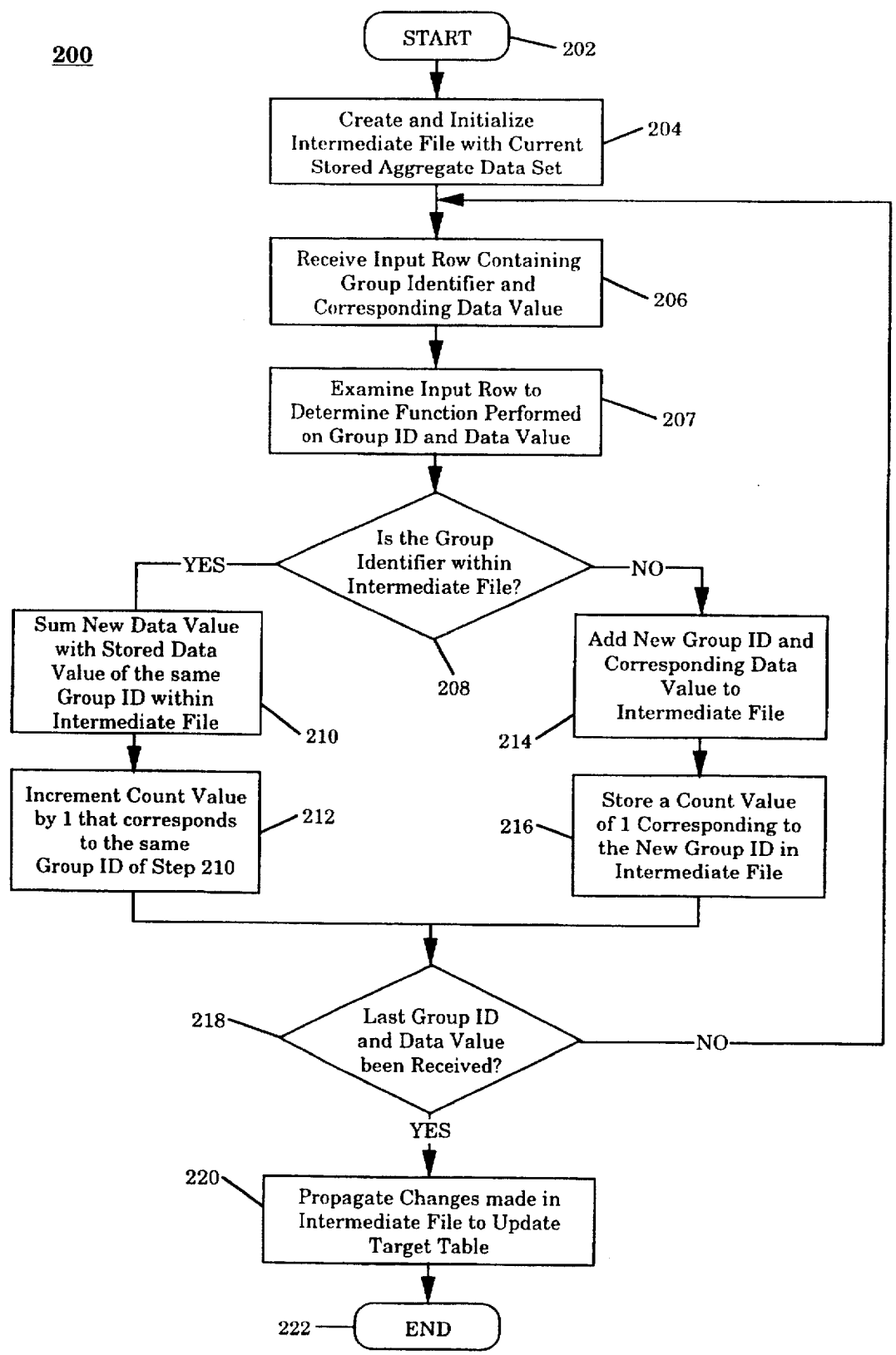
FIG. 2 illustrates a flowchart of an embodiment of the present invention which performs incremental aggregation comprising of Sum, Average or Count on dynamically increasing database data sets.

FIG. 2 illustrates a flowchart of an embodiment of the present invention which performs incremental aggregation comprising of Sum, Average, or Count on dynamically increasing database data sets. FIG. 2 includes process 200 which starts at step 202. Step 204 directs server 110 of FIG. 1 to create and initialize either intermediate disk file 114 or 115 with the aggregated data set currently stored within a target table located within data marts/warehouses 113. The purpose of step 204 is to prepare either intermediate disk file 114 or 115 to store the aggregation of newly inputted data from operational database 116 with the data that has already been stored within the target table within data marts/warehouses 113. The present invention can use either intermediate disk file 114 or 115 for its aggregation operations. For clarity during the explanation of the operation of the present invention, intermediate disk file 115 will be used during further description of process 200.

After completing step 204, step 206 of FIG. 2 directs server 110 to receive the new input row, which contains group identifiers and corresponding data values. The group identifier defines a specific group of items (e.g., hamburgers) while the data value could represent how many of the group were sold. Step 207 directs server 110 to examine the input row, which contains the group identifier and its corresponding data value, to determine the type of function that will be performed on the group identifier and corresponding data value during steps 210 or 214. For example, the functions that could be performed by server 110 on the group identifier and corresponding data value are an insert, update, or delete function. The insert function directs server 110 to add the data of the input row to intermediate file 115 while the delete function directs server 110 to remove the data of the input row from intermediate file 115. The update function directs server 110 to propagate the change or changes located within the data of the input row into intermediate file 115. To clarify the explanation of the operation of the present invention, the insert function will be performed on the group identifier and corresponding data value of each input row within the intermediate file 115.

After completing step 207, step 208 directs server 110 to determine whether a received group identifier of an input row is already located within the stored information of intermediate disk file 115. If the received group identifier is not located within intermediate disk file 115, server 110 is directed to step 214. Step 214 directs server 110 to add the new unique group identifier and its corresponding data value to the list of data stored within intermediate disk file 115. Step 216 directs server 110 to store a count value equal to the value of one that corresponds to the new group identifier just added to the stored data within intermediate disk file 115.

If the group identifier of an input row is located within intermediate disk file 115, step 208 of FIG. 2 directs server 110 to step 210. Step 210 directs server 110 to aggregate the newly received data value with the stored data value, located within intermediate disk file 115, both data values corresponding to the same group identifier. Step 212 directs server 110 to increment the stored count value by one which corresponds to the same group identifier of step 210. The stored count value, corresponding to a specific group identifier, represents the amount of times that specific group identifier has been received by server 110.

Steps 212 and 216 both direct server 110 to step 218 of FIG. 2. Step 218 directs server 110 to determine if the last group identifier and its corresponding data value have been received and processed by process 200. If the last group identifier and its corresponding data value have not been received and processed, step 218 directs server 110 to step 206. Server 110 repeats steps 206–218 until the last group identifier and data value have been received and processed by server 110.

Once the last group identifier and data value has been received and processed by server 110, step 218 directs server 110 to step 220. Step 220 directs server 110 to propagate the changes made within intermediate disk file 115 to the target table stored within data marts/warehouses 113 to update it with the new information. For optimization in speed, only the changes that occurred within intermediate disk file 115 are stored within the target table located within data marts/warehouses 113. This optimization results in quicker storage and the elimination of unneeded storing procedures. Once step 220 is completed, server 110 is directed to step 222 which ends process 200.

Once process 200 of FIG. 2 is complete, stored within a target table located within data marts/warehouses 113 of FIG. 1 is each distinctive group identifier along with its corresponding sum of data values and a count corresponding to each specific group identifier indicating the amount of times each specific group identifier was received. With these three variables, the present invention is also able to direct server 110 to determine the average data value for each group identifier as part of its aggregation operations. The average data value, Average, for a specific group identifier is computed by server 110 based on the relationship shown below:

Average=Sum/Count

Where Sum is equal to the sum of the data values of a group identifier and Count is equal to the count corresponding to that particular group identifier. The average data value can be computed for each group identifier and provides important information about the raw stored data.

Similar to the process described in process 200 of FIG. 2, the present invention is also able to direct server 110 (FIG. 1) to use the data values of the group identifiers to compute the maximum and minimum data values. Computing the maximum and minimum data values are each a separate function of the aggregation operations of the present invention. Determining the maximum data value of all the groups could be useful in determining, for example, the customer who has spent the most amount of money. Computing the minimum data value of all the group identifiers can likewise result in useful information for a decision maker.

Included within the present invention functions of incremental aggregation operations is the ability to direct server 110 (FIG. 1) to compute the variance of a user defined value or variable x. The variance of a number is computed by server 110 based on the relationship shown below:

$$\text{Variance of } x = \frac{\sum_{i=1}^{n} x_i^2 - \frac{1}{n}\left[\sum_{i=1}^{n} x_i\right]^2}{n-1}$$

Wherein xi is one of the elements of a user defined value x and n is the number of elements in the set of x. If the value of n is equal to 1, the variance is equal to zero. Computing the variance of a user defined value can result in the translating of raw data into meaningful information useful to a decision maker.

Another function included within the incremental aggregation operations of the present invention is the ability to direct server 110 to compute the standard deviation of a user defined value or variable x. The standard deviation is computed by first computing the variance as described above and then executing the square root of the value that represents the variance. Computing the standard deviation of a user defined value can result in the translating of unintelligible data into useful information to be use in making key decisions.

Moreover, the present invention has the ability within its incremental aggregation operations to direct server 110 to compute the median of a user defined value or variable x. Furthermore, the present invention has the ability within its incremental aggregation operations to direct server 110 to compute the rank of a user defined value or variable x. The rank function, for example, may require server 110 to rank the ten largest data values located within intermediate file 115 in a list in descending order. Computing the median or rank of a user defined value can result in the translating of unintelligible data into useful information to be use in making key decisions.

Figure 3A:
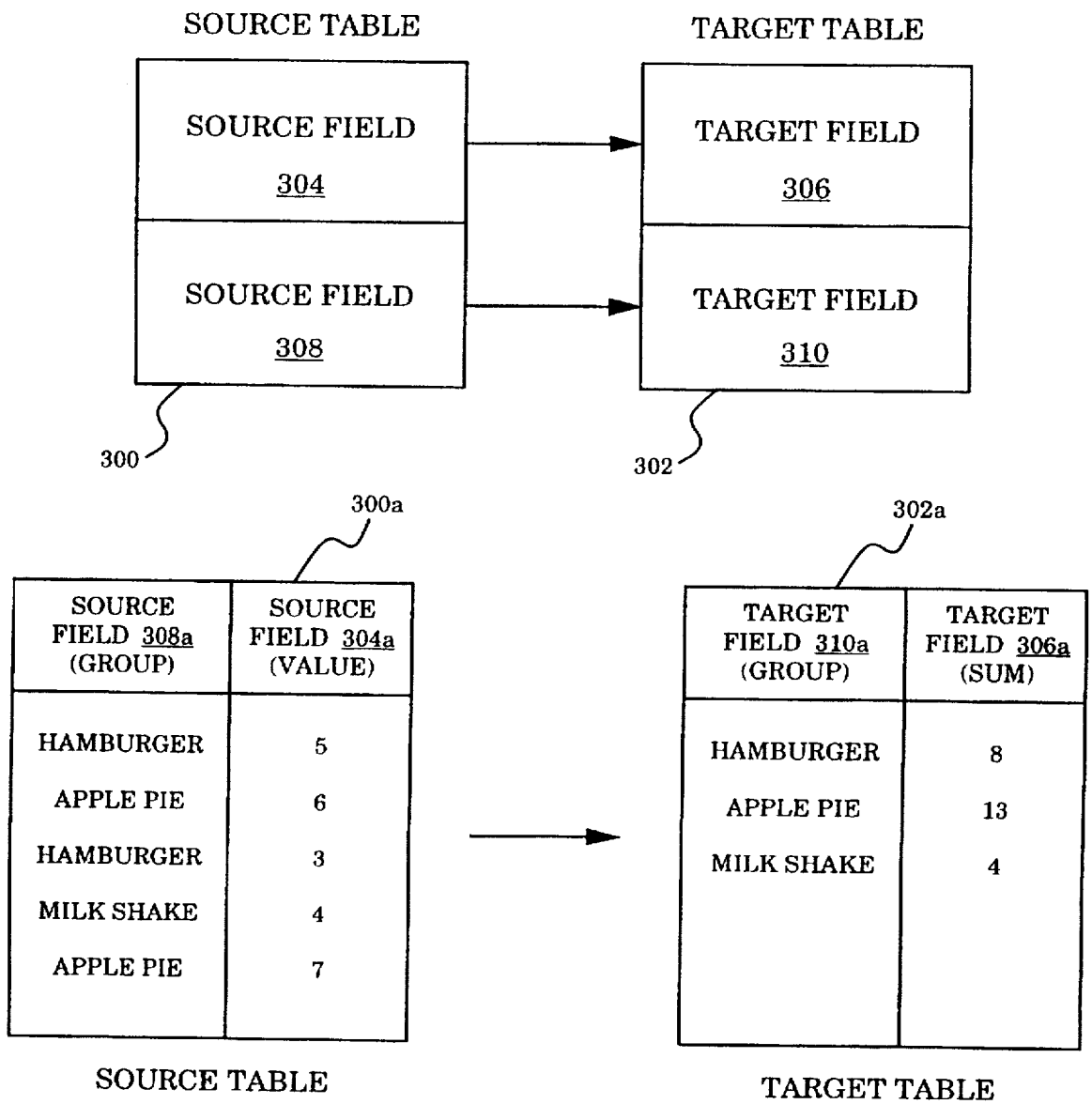
FIG. 3A illustrates a block diagram and tables representing how the present invention operates to incrementally aggregate dynamically increasing database data sets.

FIG. 3A illustrates a block diagram and tables representing how the present invention operates to direct server 110 (FIG. 1) to incrementally aggregate dynamically increasing database data sets. Source table 300 represents the newly inputted data of operational database 116 that is received by server 110 for eventual storage within target table 302, located within data marts/warehouses 113. Located within source table 300 is source fields 304 and 308 which jointly contain specific newly inputted data. Source field 308 contains the newly inputted group identifiers while source field 304 contains their corresponding data values. Target table 302 contains target fields 306 and 310 which jointly contain the stored aggregated data value for each corresponding group identifier. Specifically, target field 310 contains the stored unique group identifiers while target field 306 contains the corresponding aggregated sum data values of each group identifier.

Source table 300a and target table 302a of FIG. 3A are provided to illustrate a specific example of how the present invention directs server 110 (FIG. 1) to perform aggregate operations. Source table 300a and target table 302a each represent a more detailed depiction of source table 300 and target table 302, respectively. Source field 304a of source table 300a contain the data values while source field 308a contains the corresponding group identifiers. Each data value of source field 304a corresponds to the group identifier of source field 308a located within the same row of source table 300a. Likewise, each aggregated sum data value of target field 306a corresponds to the group identifier of target field 310a located within the same row of target table 302a.

To more fully understand the aggregation operations of the present invention, source table 300a and target table 302a of FIG. 3A will be used in a specific example. The data value corresponding to the hamburgers group represents the amount of hamburger that were sold within an hour. The data value corresponding to the apple pie group represents the amount of apple pies that were sold within an hour. The data value corresponding to the milk shake group represents the amount of milk shakes that were sold within an hour.

Source field 308a of FIG. 3A contains the different group identifiers while source field 304a contains their corresponding data values. It can be observed that the first row within source table 300a represents the fact that 5 hamburgers were sold within an hour, while the second row represents the fact that 6 apple pies were sold within an hour. The third row within source table 300a represents the fact that 3 hamburgers were sold within an hour, while the fourth row represents the fact that 4 milk shakes were sold within an hour. The fifth row located within source table 300a represents the fact that 7 apple pies were sold within an hour. The present invention directs the aggregation of this newly inputted data and then stores this information within target table 302a.

As illustrated within target table 302a of FIG. 3A, the present invention directs server 110 to receive and aggregate all the data values of the hamburger group and store them for a total of 8 hamburgers sold within an hour, which is shown in the first row of target table 302a. The present invention directs server 110 to receive and aggregate all the data values of the apple pie group and store them for a total of 13 apple pies sold within an hour, which is shown in the second row of target table 302a. Moreover, the present invention directs server 110 to receive the data value of the milk shake group and store it for a total of 4 milk shakes sold within an hour, which is shown in the third row of target table 302a. This example illustrates the aggregation operation that is performed by server 110 (FIG. 1) under the direction of the present invention. To more fully understand how the present invention performs its aggregation operations, it will be shown within FIG. 3B how the present operation directs server 110 to receive and perform aggregation on a new source table of information and how changes are made to the values that already exist within target table 302a.

Figure 3B:
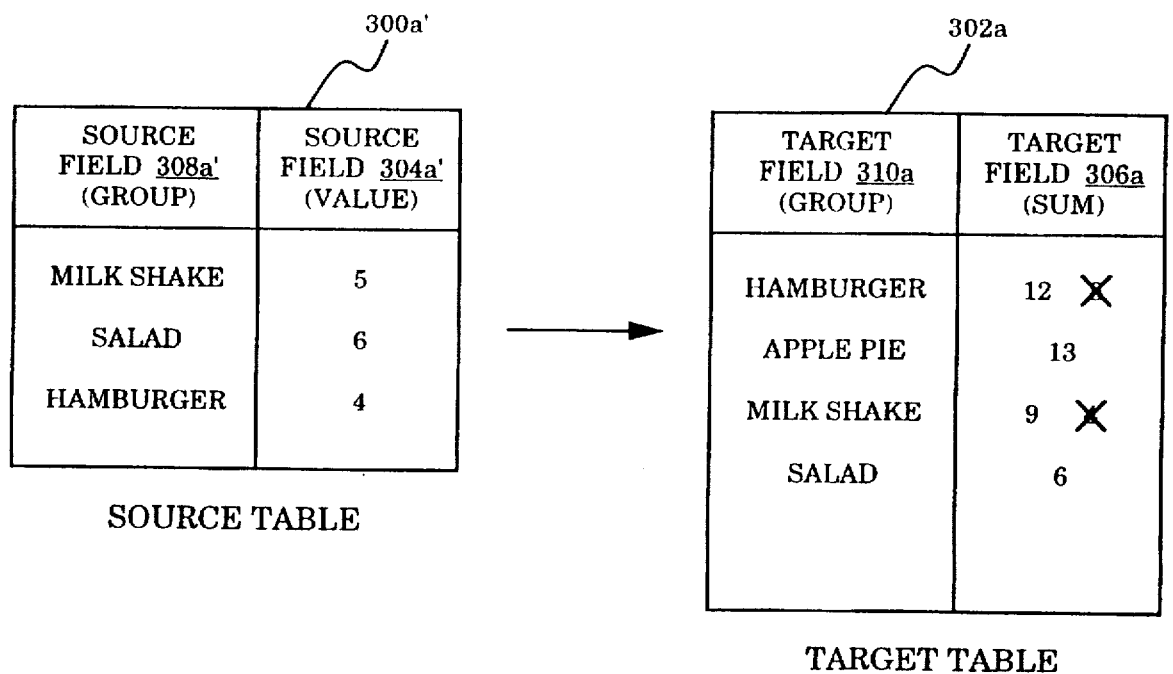
FIG. 3B shows source table 300a' and target table 302a of FIG. 3A to illustrate more fully how the present invention incrementally aggregates dynamically increasing the database data sets.

FIG. 3B shows source table 300a' and target table 302a of FIG. 3A to illustrate more fully how the present invention incrementally aggregates dynamically increasing the database data sets. Target table 302a is exactly the same table that is shown in FIG. 3A, except that it exhibits how the present invention directs server 110 to change the data values and add new group identifiers and their corresponding data values, as they are received. Source table 300a' is the same type of table representation as source table 300a of FIG. 3A, except that source table 300a' represents a new set of input data values along with corresponding group identifiers. The group identifiers located within both source table 300a' and target table 302a represent that same things as described above for FIG. 3A. The only difference is that there is a new group identifier that has not yet been defined. The data value corresponding to the salad group represents the amount of salads that were sold within an hour.

Source field 308a' of FIG. 3B contains the different group identifiers while source field 304a' contains their corresponding data values. It can be observed that the first row within source table 300a' represents the fact that 5 milk shakes were sold within an hour, while the second row represents the fact that 6 salads were sold within an hour. The third row within source table 300a' represents the fact that 4 hamburgers were sold within an hour. The present invention directs server 110 to receive this second set of newly inputted data and then incrementally aggregate it and store it within target table 302a.

As illustrated within target table 302a of FIG. 3B, the present invention directs server 110 (FIG. 1) to receive all the data values of the hamburger group and incrementally aggregate them with the data value that already existed in FIG. 3A and store them for a new total of 12 hamburgers sold within an hour, which is shown in the first row of target table 302a. The present invention did not receive any data values for the apple pie group, so the data value that already existed within target table 302a for the apple pie group is not modified and remains constant at 13 apple pies sold within an hour. This constant data value of the apple pie group is shown in the second row of target table 302a. The present invention directs server 110 to receive all the data values of milk shake group and aggregate them with the data value that already existed in FIG. 3A and store them for a new total of 9 milk shakes sold within an hour, which is shown in the third row of target table 302a. Moreover, the present invention directs server 110 (FIG. 1) to receive the new salad group and its corresponding data value and store them within target table 302a for a total of 6 salads sold within an hour, which is shown in the fourth row of the table. This example illustrates the incremental aggregation operation that is performed by the present invention on dynamically increasing database data sets.

In one embodiment of the present invention, a high speed search mechanism is used to search through intermediate disk file 114, which resides within server 110 of FIG. 1, or intermediate disk file 115. One way to implement this high speed search mechanism within the present invention is to use a b-tree, which is well-known to those of ordinary skill in the art. For example, assume there is one million groups stored within intermediate disk file 114 of FIG. 1. A new group is inputted into server 110 from operational database 116, which needs to determine if the newly received group is located within the one million stored groups or not. The b-tree methodology is able to quickly determine whether the newly received group is located within the one million stored groups without evaluating each and every stored group.

Another embodiment of the present invention to quicken the aggregation operations is to move the data stored within either intermediate disk files 114 or 115 into the random access memory (RAM) of server 110 of FIG. 1. This allows the aggregation operations of the present invention to be performed much quicker than if it was done from the hard drive of server 110. In other words, the present invention will cache the b-tree disk file in RAM to be utilized.

In yet another embodiment of the present invention there is a method for maintaining the integrity of either intermediate files 114 or 115 of FIG. 1. To accomplish this method, a copy is made of either intermediate files 114 or 115 before and after the new inputted data from operational database 116 is aggregated by the present invention. By making these copies before and after the aggregation of new inputted data, it ensures that the information stored within either intermediate disk files 114 or 115 remain accurate before eliminating the previously saved copy. This copying is also performed to guard against a system failure happening before or after aggregation has taken place. Another process that is performed to prevent against the loss of data during a system failure is that either intermediate disk files 114 or 115 have sealed significants of the data bits to ensure data correctness.

Furthermore, in the present invention, individual intermediate disk files 114 or 115 (FIG. 1) may be created for each target table 302 (FIG. 3A) aggregation. In other words, if there are several target tables and there are different items being aggregated, there will be different intermediate disk files that are saved for each specific target to ensure that the data is proper for that specific target table.

A further embodiment of the present invention includes the ability to provide failure recovery support. When constructing the b-tree, a system failure can occur before or after it is constructed. If the failure occurs before the b-tree is constructed, the present invention is able to return to the previously saved point and maintain the data integrity. If the system failure occurs after the b-tree has been successfully constructed but before the target database has been updated, intermediate disk files 114 or 115 contains an accurate copy of the aggregated data but the target data is out of synch. To solve this problem, a specific mechanism is used that is able to load directly from the b-tree into the target table at high speeds without error.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a computer system database, a method for incrementally aggregating dynamically changing an operational database data sets, said method comprising the steps of:

a) creating an intermediate file;

b) initializing intermediate file with an aggregate data set stored within said operational database which includes a set of stored group identifiers and a set of stored data values corresponding to said stored group identifiers;

c) receiving an input group identifier and an input data value that corresponds to said input group identifier that are both contained within a set of new input data;

d) determining if said input group identifier is identical to any of said stored group identifiers stored within said intermediate file;

e) aggregating said input data value to a corresponding said stored data value if said input group identifier is identical to any said stored group identifier found within said intermediate file;

f) storing said input group identifier within said intermediate file if said input group identifier is not identical to any of said stored group identifiers stored within said intermediate file;

g) storing any changes made to said intermediate file into said aggregate data set stored within said operational database.

2. A method as described in claim 1 wherein steps c) through f) are repeated for subsequent input group identifier of said set of new input data.

3. A method as described in claim 1 wherein said aggregate data set further comprises a count value corresponding to said stored group identifier, said count value representing the amount of times said group identifier has been received by said computer system database.

4. A method as described in claim 2 wherein said aggregating step further comprises the step of incrementing a count value that corresponds to said stored group identifier located within said intermediate file.

5. A method as described in claim 3 wherein said step of storing said input group identifier comprises the step of storing a count of one that corresponds to a newly stored input group identifier within said intermediate file.

6. A method as described in claim 1 further comprising the step of determining the average data value by dividing said data value stored within said intermediate file by said count value of a specific group identifier.

7. A method as described in claim 1 further comprising the step of determining the maximum data value stored within said intermediate file.

8. A method as described in claim 1 further comprising the step of determining the minimum data value stored within said intermediate file.

9. A method as described in claim 1 further comprising the step of determining the median value of a user defined value or variable stored within said intermediate file.

10. A method as described in claim 1 further comprising the step of determining the rank of a user defined value or variable stored within said intermediate file.

11. A method as described in claim 1 further comprising the step of determining the variance of a user defined value or variable x located within said intermediate file according to:

$$\text{Variance of } x = \frac{\sum_{i=1}^{n} x_i^2 - \frac{1}{n}\left[\sum_{i=1}^{n} x_i\right]^2}{n-1}$$

wherein $x_i$ is one of said elements of a user defined value x and n is the number of elements in a set of x, and if the value of n is equal to 1, said variance is equal to zero.

12. A method as described in claim 8 further comprising the step of determining the standard deviation based a relationship of executing the square root of the variance of x.

13. A method as described in claim 1 wherein said determining step comprises the step of using a b-tree as a search mechanism to search through said intermediate file.

14. A method as described in claim 1 wherein said initializing step comprises the step of storing said intermediate file within random access memory of said computer system.

15. A method as described in claim 1 wherein said initialing step comprises the step of creating a copy of the elements that are stored within said intermediate file after said aggregate data set is stored within said intermediate file.

16. A method as described in claim 1 wherein said storing step comprises the step of creating a copy of the elements that are stored within said intermediate file before storing the changes that were made to said intermediate file into said aggregate data set stored within said operational database.

* * * * *